(12) United States Patent
Oh (10) Patent No.: US 12,325,309 B2
(45) Date of Patent: Jun. 10, 2025

(54) METHOD OF CONTROLLING TORQUE OF DRIVE SYSTEM OF ELECTRIC VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 184 days.

(21) Appl. No.: 18/237,275

(22) Filed: Aug. 23, 2023

(65) Prior Publication Data

US 2024/0317068 A1    Sep. 26, 2024

(30) Foreign Application Priority Data

Mar. 22, 2023  (KR) .................. 10-2023-0037016

(51) Int. Cl.
 *B60L 15/20*  (2006.01)
(52) U.S. Cl.
 CPC ......... *B60L 15/20* (2013.01); *B60L 2240/423* (2013.01); *B60L 2250/26* (2013.01)
(58) Field of Classification Search
 None
 See application file for complete search history.

(56) References Cited

U.S. PATENT DOCUMENTS

| | | | | |
|---|---|---|---|---|
| 10,576,838 | B2* | 3/2020 | Message | B60L 15/32 |
| 11,254,220 | B2* | 2/2022 | Hancock | B60W 30/18127 |
| 11,413,972 | B2* | 8/2022 | Gauthier | B60K 7/0007 |
| 11,498,565 | B2* | 11/2022 | Cosfeld | B60K 6/52 |
| 2017/0334432 | A1 | 11/2017 | Kawai et al. | |
| 2018/0162365 | A1 | 6/2018 | Kim et al. | |
| 2022/0135021 | A1 | 5/2022 | Furuta | |
| 2023/0241983 | A1* | 8/2023 | Ravichandran | B60L 15/2045 701/22 |

FOREIGN PATENT DOCUMENTS

| | | |
|---|---|---|
| JP | 2008-024022 A | 2/2008 |
| JP | 2008-167612 A | 7/2008 |
| JP | 2017-105442 A | 6/2017 |
| JP | 2018-095246 A | 6/2018 |
| KR | 10-1448746 B | 10/2014 |
| KR | 10-1704243 B | 2/2017 |
| KR | 2022-0096746 A | 7/2022 |

* cited by examiner

*Primary Examiner* — Todd Melton
(74) *Attorney, Agent, or Firm* — Morgan, Lewis & Bockius LLP (57) ABSTRACT

A method of controlling torque of a drive system of an electric vehicle includes determining, by a controller, required torque according to a vehicle driving state while the vehicle is driven, and determining a total torque command based on the determined required torque, and performing, by the controller, a front wheel and rear wheel torque distribution process on the total torque command, so that a front wheel torque command and a rear wheel torque command following the total torque command are determined.

20 Claims, 8 Drawing Sheets

METHOD OF CONTROLLING TORQUE OF DRIVE SYSTEM OF ELECTRIC VEHICLE

CROSS-REFERENCE TO RELATED APPLICATION

The present application claims priority to Korean Patent Application No. 10-2023-0037016 filed on Mar. 22, 2023, the entire contents of which is incorporated herein for all purposes by this reference.

BACKGROUND OF THE PRESENT DISCLOSURE

Field of the Present Disclosure

The present disclosure relates to a method of controlling torque of a drive system of an electric vehicle. More particularly, it relates to a torque control method capable of generating torque by evading a backlash band of a drive system in an electric vehicle and improving vehicle responsiveness and behavioral responsiveness.

Description of Related Art

In general, the drive system of a vehicle needs to generate appropriate torque according to a torque command determined by a driving input value of a driver (for example, an accelerator pedal input value, a brake pedal input value, etc.) or a request of an advanced driver assistance system (ADAS).

At the present time, when a torque change rate is set to be excessively high, there may be problems such as drive shaft torsion, gear backlash hit, or impulsive drivability deterioration due to rapidly changing torque.

Conversely, when the torque change rate is excessively small, it takes excessive time for the driver or an ADAS controller to provide the required torque, and actual behavior of the vehicle differs from intention of the driver, causing frustrating responsiveness or dangerous situations.

Accordingly, there is a trade-off between a degree of reduction in Noise, Vibration, and Harshness (NVH) in the vehicle due to rapid torque change and a degree of ensuring acceleration/deceleration responsiveness of the vehicle.

In current mass-produced vehicles, slope limiting and filters using various conditions as factors are used to generate optimal torque commands capable of solving such trade-off.

Furthermore, in an electrified vehicle using a motor as a driving source or a part thereof, active feedback torque compensation control capable of suppressing vibration that has previously occurred using a motor may be applied.

However, even when advanced backlash post-correction control is applied, it is difficult to suppress a problem of deterioration in vehicle responsiveness, which inevitably occurs chronically due to characteristics of hardware. Moreover, noise, vibration, and harshness (NVH) issues due to backlash frequently occur in an electric vehicle including few vibration damping elements in a drive system.

A related art discloses a method of generating a model speed of a drive shaft using a disturbance observer and reducing vibration using a deviation between the model speed and an actual speed of the drive shaft. The related art also includes a method of calculating a model speed based on a wheel speed instead of the disturbance observer in determining the model speed.

Furthermore, a related art discloses a method of generating a model speed of a motor using an input torque model and reducing vibration using a deviation between the model speed and an actual speed of the motor.

Furthermore, a related art includes a method of estimating a speed of a drive system using a torque model and determining a slope of a torque command using a difference between an actual speed and the estimated speed of the drive system.

However, all of the above conventional technologies only suggest a torque compensation method for reducing and suppressing vibration generated in a drive system, and fail to suggest a torque determination method capable of preventing occurrence of vibration itself in advance.

Therefore, in relation to the backlash of the drive system, there is a demand for a control method capable of generating a torque command by evading a backlash band in which backlash of the drive system may occur, rather than a control method that alleviates a problem caused by the backlash.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a torque command generation and torque control method for a drive system of an electric vehicle configured for generating torque by evading a backlash band to prevent backlash from occurring in the drive system and improving responsiveness and behavioral responsiveness of a vehicle.

The object of the present disclosure is not limited to the object mentioned above, and other objects not mentioned herein may be clearly understood by those of ordinary skill in the art to which an exemplary embodiment of the present disclosure belongs (hereinafter referred to as "person of ordinary skill") from the description below.

Various aspects of the present disclosure are directed to providing a method of controlling torque of a drive system of an electric vehicle, the method including determining, by a controller, a required torque according to a vehicle driving state while the vehicle is driven, and determining a total torque command based on the determined required torque, and performing, by the controller, a front wheel and rear wheel torque distribution process on the total torque command, so that a front wheel torque command and a rear wheel torque command following the total torque command are determined, wherein the rear wheel torque command is determined as a value equal to or greater than a minimum torque threshold value set as a positive (+) torque value, and the minimum torque threshold value is set to a value greater than an upper limit threshold value of a backlash band, which is a torque region where there is possibility that backlash occurs in a rear wheel-side drive system.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It should be understood that the appended drawings are not necessarily to scale, presenting a somewhat simplified representation of various exemplary features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings. Specific structural or functional descriptions presented in the exemplary embodiments of the present disclosure are only illustrative for describing embodiments according to the concept of the present disclosure, and the exemplary embodiments according to the concept of the present disclosure may be implemented in various forms. Furthermore, the present disclosure should not be construed as being limited to the exemplary embodiments described herein, and should be understood to include all modifications, equivalents, and substitutes included in the spirit and scope of the present disclosure.

Meanwhile, in an exemplary embodiment of the present disclosure, even though terms such as "first", "second", etc. may be used to describe various elements, the elements are not limited by these terms. These terms are only used to distinguish one element from another. For example, within the scope not departing from the scope of the rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to", should be interpreted similarly.

Like reference numerals refer to like elements throughout. The terminology used herein is for describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Various embodiments of the present disclosure relates to a method of controlling torque of a drive system of an electric vehicle, and relates to a control method configured for generating a torque command by evading a backlash band in which backlash in the drive system may occur rather than a control method for mitigating a problem caused by backlash in the drive system.

Various aspects of the present disclosure are directed to providing a drive system torque command generation and torque control method configured for improving vehicle responsiveness and tip-in responsiveness.

In an exemplary embodiment of the present disclosure, a backlash band may be defined as a torque region in which backlash may occur in a drive system of a vehicle. Here, the drive system of the vehicle includes drive elements such as a drive shaft between a drive device and drive wheels, a reducer, a differential, and an axle in addition to the drive device and the drive wheels for driving the vehicle.

In an exemplary embodiment of the present disclosure, "torque" encompasses both driving torque for accelerating the vehicle and braking torque for decelerating the vehicle. Herein, "braking torque" (deceleration torque) refers to regenerative braking torque by a motor.

Unless otherwise specified in the present specification as being divided into driving torque and braking torque, torque may be a driving torque for accelerating the vehicle (acceleration situation) or a braking torque for decelerating the vehicle (deceleration situation) depending on the driving situation of the vehicle.

In an exemplary embodiment of the present disclosure, the driving torque and a driving torque command each include a torque value for accelerating the vehicle, which is defined as a positive (+) torque value. On the other hand, the braking torque and the braking torque command each include a torque value for decelerating the vehicle, which is defined as a negative (−) torque value.

In the following description, when the front wheel torque command and the rear wheel torque command indicate negative values, each of the front wheel torque command and the rear wheel torque command indicating the negative values refers to a regenerative braking torque command.

As described above, when the vehicle is driving, positive (+) torque, which is forward torque, or negative (−) torque, which is reverse torque, is applied to the drive system depending on whether the vehicle is accelerating or decelerating, and a direction of the torque applied from the motor to the drive system and transmitted through the drive system may change depending on the driving situation of the vehicle.

The present disclosure has been generated based on the principle that a problem caused by backlash in the drive system of the vehicle mainly occur only in a torque region close to 0, and the torque region close to 0 may be referred to as a backlash band where a backlash problem may occur.

In an exemplary embodiment of the present disclosure, the backlash band includes a backlash band of a front wheel-side drive system, which is a torque region in which backlash may occur in the front wheel-side drive system, and a backlash band of a rear wheel-side drive system, which is a torque region in which backlash may occur in the rear wheel-side drive system.

In an exemplary embodiment of the present disclosure, the backlash band of the front wheel-side drive system and the backlash band of the rear wheel-side drive system may be set to a torque range bordering a lower threshold value, which is a negative (−) value, and an upper limit threshold value, which is a positive value (+).

That is, the backlash band may be set to a torque range including 0, and a backlash state may occur when input torque applied from the motor, which is the drive device, to the drive system enters the set backlash band.

Figure 1:
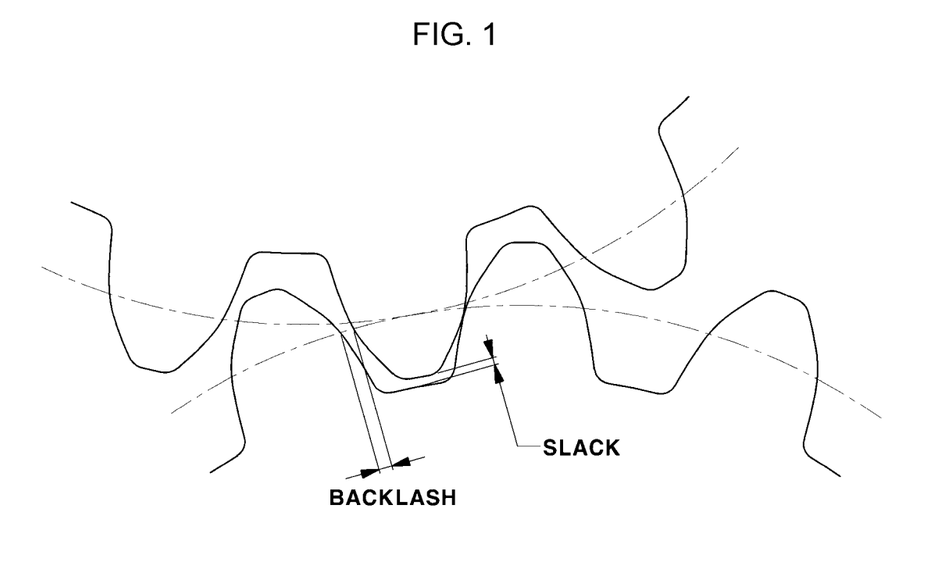
FIG. 1 is a diagram illustrating backlash.

Backlash is a tolerance that exists between meshing teeth of two gears as illustrated in FIG. 1. Between two meshed gears, vibration or noise may occur as gear teeth strike each other due to backlash, and in the worst case, backlash may cause gear damage.

When torque is continuously applied in one direction, one of the two meshed gears continues to transmit force to the other in the same direction. Thus, the teeth of the two meshed gears are aligned and meshed in a forward direction, and at the present time, a problem due to backlash tolerance does not occur.

However, when the direction of the torque is changed, the teeth of the gear reversely align after experiencing a backlash tolerance as a direction of force transmission is reversed. At the present time, after alignment in the reverse direction is performed, while the force in the same direction is continuously transmitted, meshing of the gears is not released again, and thus a problem due to backlash does not occur.

However, at the moment when the direction of the transmitted force is changed again, a problem due to backlash occurs when meshing between the teeth of the two gears is released and then meshing is performed again while passing the meshing tolerance.

Therefore, a core of a method for not causing the backlash problem is to eliminate or minimize a situation of releasing gear engagement, which may be achieved by eliminating or minimizing a direction change of a torque command with respect to the drive device such as the motor.

To minimize the direction change of the torque command, front and rear wheel drive devices, that is, a front wheel motor and a rear wheel motor, need to share functions, which may limit maximum acceleration performance.

Figure 2:
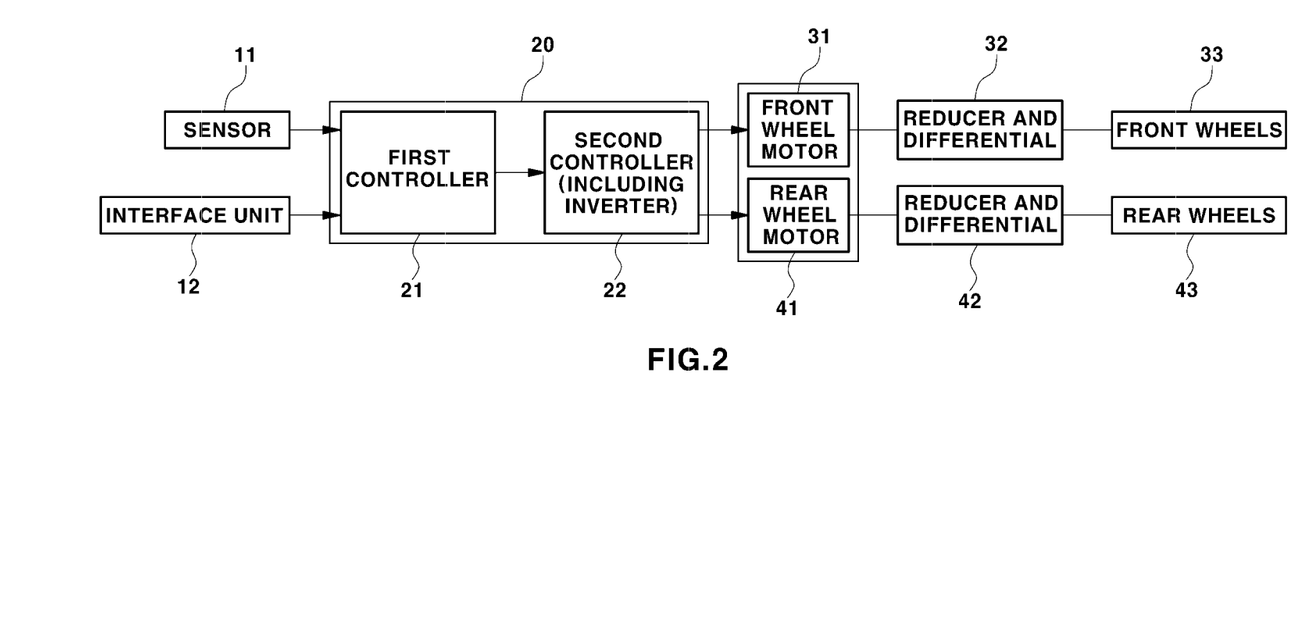
FIG. 2 is a block diagram illustrating a configuration of a device configured for performing a drive system torque control process according to various exemplary embodiments of the present disclosure.
Figure 3:
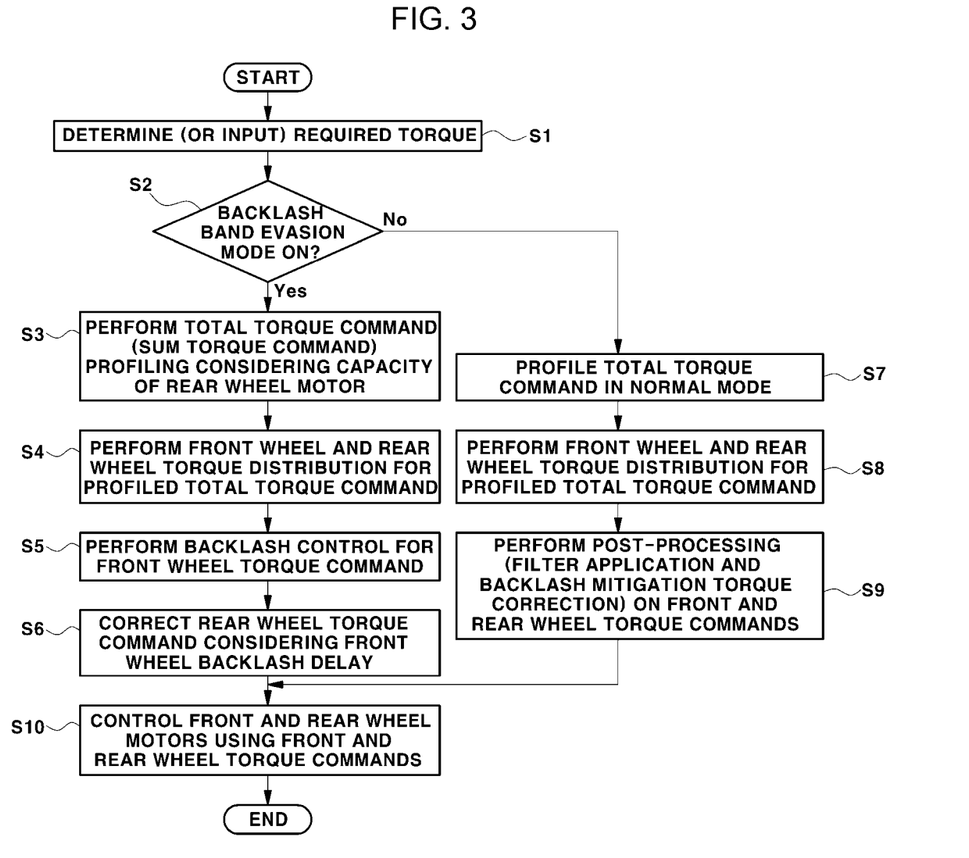
FIG. 3 is a flowchart illustrating the drive system torque control process according to various exemplary embodiments of the present disclosure.

FIG. 2 is a block diagram illustrating a configuration of a device for performing a drive system torque control process according to various exemplary embodiments of the present disclosure, and FIG. 3 is a flowchart illustrating the drive system torque control process according to various exemplary embodiments of the present disclosure.

The present disclosure may be applied to a vehicle provided with a plurality of drive devices, and may be applied to a vehicle in which front wheels 33 and rear wheels 43 are driven by independent drive devices, respectively. Furthermore, the present disclosure may be applied to an electric vehicle that runs using motors 31 and 41 as the drive devices.

The present disclosure may be applied to a vehicle provided with a front wheel drive device configured for applying torque to the front wheels 33 and a rear wheel drive device configured for applying torque to the rear wheels 43. Furthermore, the present disclosure may be applied to a vehicle in which both the front wheel drive device and the rear wheel drive device are motors. In the following description, the motor 31 driving the front wheels 33 will be referred to as a "front wheel motor" and the motor 41 driving the rear wheels 43 will be referred to as a "rear wheel motor".

Referring to FIG. 2, the front wheel motor 31 and the rear wheel motor 41 are illustrated as drive devices of the electric vehicle. The front wheel motor 31 and the rear wheel motor 41 are connected to the front wheels 33 and the rear wheels 43 provided as drive wheels through drive system elements such as reducers, differentials 32 and 42, and axles, respectively, so that power may be transmitted.

Accordingly, torque output from the front wheel motor 31 and the rear wheel motor 41 may be transmitted to the front wheels 33 and the rear wheels 43 through drive system elements such as the reducers, the differentials 32 and 42, and the axles, respectively.

Furthermore, although not separately illustrated in FIG. 2, a battery is connected to the front wheel motor 31 and the rear wheel motor 41 via an inverter so that the battery may be charged and discharged. The inverter may include a front wheel inverter for driving and controlling the front wheel motor 31 and a rear wheel inverter for driving and controlling the rear wheel motor 41.

In the electric vehicle, the front wheel motor 31 and the rear wheel motor 41 operate using power from the battery, and the battery is connected to the front wheel motor 31 and the rear wheel motor 41 via the front wheel inverter and the rear wheel inverter so that the battery may be charged and discharged.

In the electric vehicle, operations (driving and regeneration) of the front wheel motor 31 and the rear wheel motor 41 are controlled according to torque commands generated by a controller 20. At the present time, the controller 20 is configured to determine required torque according to a vehicle driving state to drive the vehicle, and generates a final torque command (total torque command) based on the determined required torque.

Furthermore, the controller 20 is configured to control the operations of the front wheel motor 31 and the rear wheel motor 41 through the inverter according to the final torque command. In the following description, when the torque command is a positive (+) value, the torque command is defined as a driving torque command, and when the torque command is a negative (−) value, the torque command is defined as a regenerative braking torque command.

Furthermore, the final torque command is a pre-distribution torque command before torque distribution to the front and rear wheels, and in the following description, pre-distribution torque command, sum torque command, and total torque command are used interchangeably.

In an exemplary embodiment of the present disclosure, the controller 20 may include a first controller 21 that is configured to determine required torque based on a driving input value of the driver or receives required torque from another controller such as an ADAS controller, and generates and outputs a torque command based on the required torque, and a second controller 22 that is configured to control the operations of the front wheel motor 31 and the rear wheel motor 41 according to the torque command input from the first controller 21.

The first controller 21 may be a vehicle control unit (VCU) that is configured to determine and generates a torque command for controlling an operation of a motor in a typical vehicle. Because a method and process for determining a torque command in a vehicle are well-known technical matters in the field of the present disclosure, a detailed description thereof will be omitted.

Furthermore, the first controller 21 may be configured to determine the front wheel torque command and the rear wheel torque command from the final torque command through a front wheel and rear wheel torque distribution process. Accordingly, when the front wheel torque command and the rear wheel torque command are output from the first controller 21, the second controller 22 receives the front wheel torque command and the rear wheel torque command, and operates the front wheel motor 31 and the rear wheel motor 41 through the front wheel inverter and the rear wheel inverter.

The second controller 22 may be a general motor control unit (MCU) that is configured to control an operation of a driving motor through the inverter according to a torque command output from the VCU in the electric vehicle.

In the above description, a control subject is divided into the first controller 21 and the second controller 22. However, the torque control process according to an exemplary embodiment of the present disclosure may be performed by one integrated control element instead of a plurality of controllers.

A plurality of controllers and one integrated control element may be collectively referred to as a controller, and the torque control process according to an exemplary embodiment of the present disclosure described below may be performed by the present controller.

In an exemplary embodiment of the present disclosure, vehicle driving information, such as a driving input value of the driver input to the controller 20, is information indicating a vehicle driving state, and may include sensor detection information detected by a sensor 11 and input to the controller through a vehicle network.

At the present time, the sensor 11 for detecting the vehicle driving information may include an accelerator position sensor (APS) for detecting an accelerator pedal input value (APS value, %) of the driver, a brake pedal position sensor (BPS) for detecting a brake pedal input value (BPS value, %) of the driver, a sensor configured for detecting a drive system speed, and a sensor configured for detecting a vehicle speed.

Here, the drive system speed may be a rotation speed of the front wheel motor 31 and the rear wheel motor 41, which are driving motors, or a rotation speed (wheel speed) of the drive wheels 33 and 43. At the present time, the sensor configured for detecting the drive system speed may be a sensor configured for detecting the rotation speed of each of the motors 31 and 41, which may be a normal resolver for detecting a rotor position of the motor. Alternatively, the sensor configured for detecting the drive system speed may be a wheel speed sensor configured for detecting the rotation speed (wheel speed) of the drive wheels 33 and 43.

Furthermore, the sensor configured for detecting the vehicle speed may also be a wheel speed sensor. Obtaining the vehicle speed information from a signal of the wheel speed sensor is a well-known technical matter in the field of the present disclosure, and thus a detailed description thereof will be omitted.

The accelerator pedal input value (APS value, %) of the driver, the brake pedal input value (BPS value, %) of the driver, the speed (rotation speed) of the drive motors 31 and 41, the vehicle speed, etc. may be selectively used as the vehicle driving information for determining and generating the required torque and torque command in the controller 20, which is detected by the sensor 11.

In the vehicle driving information, the accelerator pedal input value and the brake pedal input value, which are pedal input values of the driver, may be referred to as driving input information of the driver, and the speed and vehicle speed of the driving motor detected by the sensor 11 may be referred to as vehicle state information.

Furthermore, the vehicle driving information may include information independently determined by the controller 20 in a broad sense, and furthermore, may include information (for example, required torque information) input to the controller 20 from another controller (for example, the ADAS controller) in the vehicle through the vehicle network.

In FIG. 2, reference numeral 12 denotes an interface unit connected to the controller 20 in the vehicle, and the interface unit 12 may include an input device and an output device. In an exemplary embodiment of the present disclosure, the interface unit 12 is provided to enable driver operation, input, selection, and display of various information, and may be used to perform an ON/OFF operation of a backlash band evasion mode (responsiveness priority mode) described later, or provide various user interfaces (UIs).

In an exemplary embodiment of the present disclosure, the input device and the output device of the interface unit 12 may be selected from known devices when the input device and the output device can perform the ON/OFF operation of the backlash band evasion mode, and input or display various information.

For example, the interface unit 12 may include an operating device such as a button or switch provided in the vehicle, an input device or a display device of an audio, video, navigation (AVN) system, or a touch screen.

Meanwhile, various aspects of the present disclosure are directed to providing a method configured for generating a torque command by evading the backlash band in which backlash in the drive system may occur. Here, evasion of the backlash band means maximally preventing a situation in which the torque command invades the backlash band.

This may be achieved by a method in which front wheel torque (which means actual torque) and a front wheel torque command maintain only negative (−) torque values, and rear wheel torque (which means actual torque) and a rear wheel torque command maintain only positive (+) torque values because the backlash issue is characterized by occurring when the direction of torque is changed as mentioned earlier.

However, when the front wheel torque command and the rear wheel torque command are limited so that the front wheel torque command and the rear wheel torque command have opposite signs between negative (−) and positive (+) signs, it may be difficult to satisfy the required torque with the torque of the front wheel motor 31 and the torque of the rear wheel motor 41.

Therefore, in an exemplary embodiment of the present disclosure, a control method of maintaining only a positive (+) torque value is applied only to the case of the rear wheel torque command to evade the backlash band, and at the present time, the front wheel torque command is determined and operated in the total torque range as needed.

When the present control method is applied, the rear wheel motor 41 side continuously aligns gears in a positive (+) torque transmission direction in order not to enter the backlash band, which may be achieved by continuously generating at least a small amount of positive (+) directional torque.

At the present time, the small amount of positive (+) directional torque for continuously aligning the gears in the positive (+) torque transmission direction may be defined as a minimum torque threshold value (which is a positive value), and accordingly, a value of the rear wheel torque command (positive value) is determined in a region equal to or greater than the minimum torque threshold value set as a positive (+) torque value.

In an exemplary embodiment of the present disclosure, the minimum torque threshold value is set in the controller 20 as a torque value outside the backlash band, which is a torque region in which backlash may occur in the rear wheel-side drive system. That is, the minimum torque threshold value may be set to a value greater than an upper limit threshold value of the backlash band of the rear wheel-side drive system.

On the other hand, in an exemplary embodiment of the present disclosure, the front wheel motor 31 side does not continuously align gears only in a negative (−) torque transmission direction, and the front wheel motor 31 is not controlled so that the front wheel motor 31 generates only negative (−) torque.

That is, the front wheel motor 31 may be controlled so that the front wheel motor 31 selectively performs driving to accelerate the vehicle or performs regeneration to decelerate the vehicle according to the motor torque command (sum torque command) finally determined from the required torque.

In the present way, unlike the rear wheel motor 41 which is controlled so that the rear wheel motor 41 generates positive (+) torque, specifically, at least the minimum torque threshold value or more, which is a positive (+) torque value, the front wheel motor 31 may be controlled so that the front wheel motor 31 generates a negative (−) torque value or generates positive (+) torque.

However, when the front wheel motor 31 performs both driving and regenerative bidirectional operations according to the finally determined total torque command (sum torque command as pre-distribution torque command), torque generated by the front wheel motor, that is, the front wheel torque, involves a change in direction, and thus it is inevitable to invade the backlash band, and slope control or correction control is required for the front wheel torque.

In to compensate for acceleration delay and delay in torque change which may occur when the torque command of one of the front wheel motor 31 and the rear wheel motor 41 invades the backlash band, there is needed a process to compensate for insufficient torque so that the required torque may be satisfied using torque of the opposite motor.

For example, delay (for example, acceleration delay) which may occur when the front wheel torque command invades the backlash band is compensated using rear wheel motor torque.

However, capacity of the opposite motor may be insufficient to perform compensation. For example, when torque generation delay that occurs when the backlash band of the front wheel torque command is invaded is compensated using the rear wheel motor torque, capacity of the rear wheel motor 41 may be insufficient to perform compensation.

To the present end, in an exemplary embodiment of the present disclosure, when the capacity of the rear wheel motor 41 is insufficient to perform compensation, a process of profiling the sum torque command (total torque command) considering the capacity of the rear wheel motor is performed.

Here, the sum torque command refers to the total torque command, which is the pre-distribution torque command, and refers to a torque command obtained by summing the front wheel torque command and the rear wheel torque command (command including the summed torque value). In an exemplary embodiment of the present disclosure, the torque command for each wheel and the torque command for each axle refer to the front wheel torque command and the rear wheel torque command.

Profiling the sum torque command (total torque command and pre-distribution torque command) and determining the final sum torque command based on the required torque may be understood as including the same meaning.

Furthermore, in the description of the present disclosure, invasion or entry into the backlash band means when a torque value of the corresponding torque command becomes a torque value in the backlash band, and passing through the backlash band means that the torque value of the torque command invades the backlash band outside the backlash band and then continuously increases or decreases, thus escaping the backlash band again.

Figure 4:
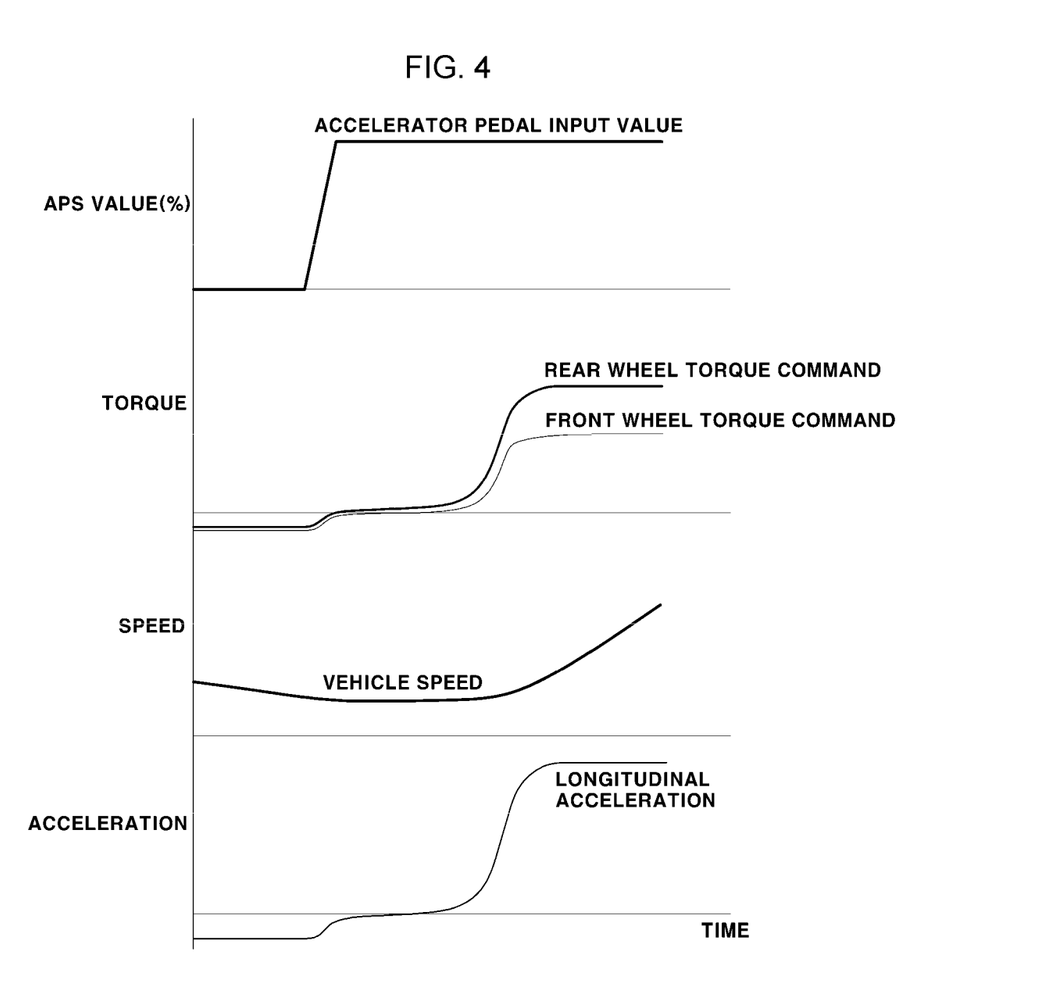
FIG. 4 is a diagram illustrating a distribution state of the front wheel torque command and the rear wheel torque command in an acceleration situation in a normal mode in which a backlash band evasion mode is turned off in an exemplary embodiment of the present disclosure.

FIG. 4 is a diagram illustrating a distribution state of the front wheel torque command and the rear wheel torque command in an acceleration situation in a normal mode. In an exemplary embodiment of the present disclosure, the normal mode may be selected when the driver turns off the backlash band evasion mode through the interface unit 12.

In an exemplary embodiment of the present disclosure, when the backlash band evasion mode is turned off, drive system torque control in the normal mode is performed. The normal mode has no difference compared to the conventional torque control mode.

The controller 20 is configured to determine the required torque by itself, as in the case of normal drive system torque control, or receives the required torque from another controller (step S1 in FIG. 3), verifies whether the backlash band evasion mode is in an OFF state (step S2 in FIG. 3), and performs profiling of the total torque command in the normal mode when the backlash band evasion mode is in the OFF state (step S7 in FIG. 3).

At the present time, as in the case of normal drive system torque control, the controller 20 is configured to determine the required torque by itself or receives the required torque from another controller, and then is configured to determine the total torque command based on the required torque.

The normal mode is a mode determined and operated in all torque ranges of positive (+) and negative (−) values according to the sum torque command, which is the pre-distribution torque command, to satisfy the required torque by the torque applied by the front wheel motor and the rear wheel motor.

As illustrated in FIG. 4, in the normal mode in which the backlash band evasion mode is turned off, both the front wheel torque command and the rear wheel torque command may be determined as negative (−) torque values when there is no input of the accelerator pedal by the driver, that is, in a vehicle deceleration section where the driver does not depress the accelerator pedal.

Thereafter, when the driver depresses the accelerator pedal to accelerate the vehicle, the front wheel torque command and the rear wheel torque command are switched from negative (−) torque values to positive (+) torque values in the normal mode, and when the torque direction is changed, it is inevitable that the front wheel torque command and the rear wheel torque command pass through the backlash band.

While passing through the backlash band in the present way, the direction of the torque applied from the motor to the drive system is not rapidly changed so that the backlash problem may be minimized even when the driver depresses the accelerator pedal.

That is, as may be seen from FIG. 4, the front wheel torque command and the rear wheel torque command are not switched from negative (−) torque to positive (+) torque immediately after the driver depresses the accelerator pedal. Furthermore, for a predetermined time period after depressing the accelerator pedal, the front wheel torque command and the rear wheel torque command are determined so that the torque applied to the drive system by the motor may change direction while passing through the backlash band (step S8 in FIG. 3).

During a time when the backlash band is passed through as described above, torque slope control is performed to limit slopes of the front wheel torque command and the rear wheel torque command, so that the torque command is not rapidly increased. Backlash control is performed so that a gentle torque change is made within the backlash band for both the front wheel torque command and the rear wheel torque command.

At the present time, the controller 20 sets a maximum permissible change rate in the backlash band for the front wheel torque command and the rear wheel torque command to a small value that does not cause backlash impact. Accordingly, the front wheel torque command and the rear wheel torque command in the backlash band are determined in the controller 20 to values that gradually change according to the maximum permissible change rate of the small value.

Furthermore, the front wheel torque command and the rear wheel torque command after passing through the backlash band are rapidly increased to values corresponding to the accelerator pedal input value (APS value, %).

At the present time, the controller 20 is configured to perform front wheel and rear wheel torque distribution to satisfy the driving torque required for acceleration driving using the sum of the front wheel torque and the rear wheel torque (step S8 in FIG. 3).

That is, the front wheel torque command and the rear wheel torque command which may satisfy the driving torque command (pre-distribution torque command), which is the total torque command during acceleration driving, are determined.

As described above, in the normal mode, when the driver tips-in the accelerator pedal and enters an acceleration situation, the front wheel torque command and the rear wheel torque command are switched from negative (−) torque values to positive (+) torque values, and both the front wheel torque command and the rear wheel torque command pass through the backlash band when the torque direction is switched.

In the present normal mode, backlash control is performed to limit the slope to the maximum permissible change rate for both the front wheel torque command and the rear wheel torque command to minimize the problem caused by backlash, and thus the acceleration delay of the vehicle is inevitable in the backlash band.

When the front wheel torque command and the rear wheel torque command are determined through the front wheel and rear wheel torque distribution in the normal mode, post-processing is performed on the determined front and rear wheel torque commands (Step S9 in FIG. 3), and a final front wheel torque command and a final rear wheel torque command are determined by applying a filter to the commands and performing backlash mitigation torque correction.

Subsequently, when the final front wheel torque command and the final rear wheel torque command are determined, the controller 20 is configured to control the front wheel motor 31 and the rear wheel motor 41 according to the determined final front wheel torque command and the determined final rear wheel torque command (step S10).

Figure 5:
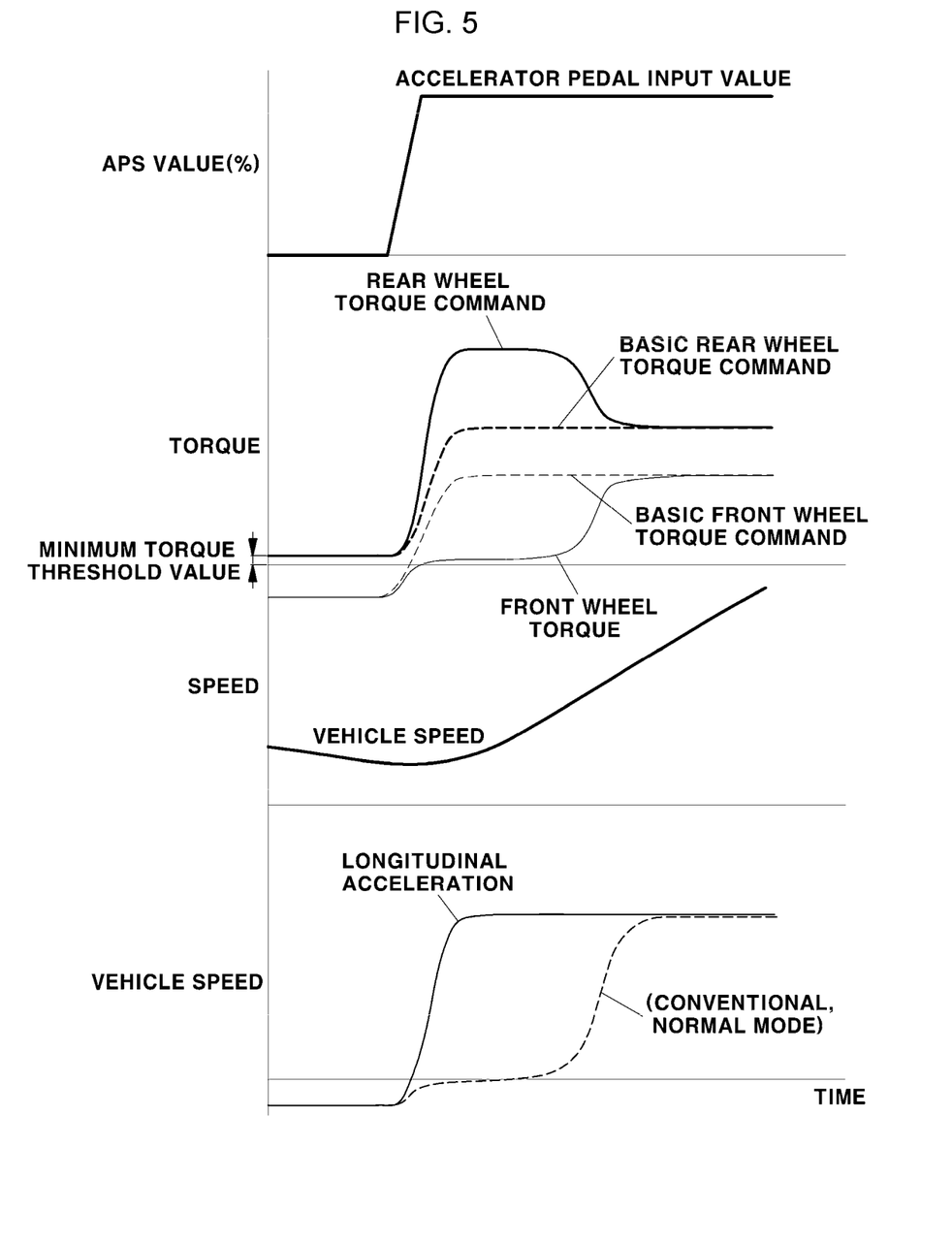
FIG. 5 is a diagram illustrating a torque control state according to various exemplary embodiments of the present disclosure.

FIG. 5 illustrates a torque control state according to various exemplary embodiments of the present disclosure, illustrates an example in which backlash band evasion control is performed, and is a diagram for describing a method of compensating for backlash delay of the front wheel torque using the rear wheel motor torque.

In various exemplary embodiments of the present disclosure, a mode in which backlash band evasion control is performed, that is, the backlash band evasion mode, may be selectively performed by operation of the driver. That is, when the driver turns on the interface unit 12, the controller 20 may enter the backlash band evasion mode by receiving an on signal output from the interface unit 12, and then perform backlash band evasion control.

Describing the process step by step, the controller 20 is configured to determine the required torque by itself or receives the required torque from another controller (step S1 in FIG. 3), and verifies whether the backlash band evasion mode is in the ON state (step S2 in FIG. 3).

Furthermore, when the backlash band evasion mode is in the ON state, the controller 20 is configured to determine a final total torque command (sum torque command as the pre-distribution torque command) based on the required torque, and is configured to perform a process of determining the total torque command considering the capacity of the rear wheel motor based on the required torque, that is, a total torque command profiling process for a backlash evasion mode (step S3 in FIG. 3).

On the other hand, when the backlash band evasion mode is in an OFF state, the controller 20 is configured to perform a process of determining the final total torque command (sum torque command), that is, a total torque command (sum torque command) profiling process for the normal mode, based on the required torque using a normal method (step S7 in FIG. 3). A process in the normal mode thereafter is the same as described with reference to FIG. 4.

Thereafter, the controller 20 distributes the total torque command profiled as described above into a front wheel torque command and a rear wheel torque command (Step S4 in FIG. 3). At the present time, the rear wheel torque command is determined as a positive (+) torque value at all times, and even during deceleration, the rear wheel torque command is determined as a minimum torque threshold value set as a positive (+) torque value.

In a deceleration situation in which the controller 20 does not detect the accelerator pedal input value by the driver, that is, in the case where the vehicle is decelerating because the driver does not depress the accelerator pedal, the total torque command finally determined from the required torque (sum torque command as the pre-distribution torque command) is a regenerative torque command and includes a negative (−) torque value.

Furthermore, even in the deceleration section where the vehicle is decelerating, the rear wheel torque command is determined as a positive (+) torque value at all times, and the front wheel torque command is determined as a negative (−) torque value. Accordingly, the rear wheel motor 41 outputs positive (+) torque and applies the positive (+) torque to the drive system at all times, and the front wheel motor 31 outputs negative (−) torque and applies the negative (−) torque to the drive system at all times.

That is, the rear wheel torque command is determined as a value equal to or greater than the minimum torque threshold value set as a positive (+) torque value, and the front wheel torque command is the determined as a value obtained by subtracting the determined rear wheel torque command (positive torque) from the total torque command (negative torque), which is the pre-distribution torque command. The front wheel torque command determined in the present way includes a negative (−) torque value.

At the present time, when the total torque command (pre-distribution torque command and sum torque command) is smaller than the minimum torque threshold value, the rear wheel torque command is determined as the minimum torque threshold value, and the front wheel torque command may be determined as a value obtained by subtracting the rear wheel torque command from the total torque command.

Thereafter, when the driver depresses the accelerator pedal, the controller 20 is configured to determine the total torque command from the required torque determined based on the accelerator pedal input value, and the determined total torque command (sum torque command) is distributed into a basic front wheel torque command and a basic rear wheel torque command. At the present time, the basic rear wheel torque command is immediately determined as an increased positive (+) torque value immediately after the accelerator pedal is depressed.

Furthermore, the basic front wheel torque command is determined as a value obtained by subtracting the basic rear wheel torque command from the total torque command. The basic front wheel torque command determined as described above may include a positive (−) torque value because the driver is depressing the accelerator pedal.

However, because the front wheel torque command includes a negative (−) torque value before the driver depresses the accelerator pedal, a process of switching the front wheel torque command from the negative (−) torque value to a positive (+) torque value needs to be performed after a tip-in point when the driver depresses the accelerator pedal.

At the present time, because the front wheel torque command needs to pass through the backlash band of the front wheel-side drive system, backlash control for the front wheel torque command needs to be performed. During backlash control during a time when the front wheel torque command passes through the backlash band, torque slope control is performed to limit a slope of the front wheel torque command so that the torque command does not rapidly increase.

To the present end, the maximum permissible change rate within the backlash band of the front wheel torque command is set in the controller 20 to a small value that does not cause backlash impact in the front wheel-side drive system. Thus, the front wheel torque command in the backlash band is determined in the controller 20 to a value that gradually changes according to the maximum permissible change rate of the small value.

Furthermore, the controller 20 rapidly increases the front wheel torque command to a value corresponding to the accelerator pedal input value (APS value, %) after passing through the backlash band.

Accordingly, the controller 20 is configured to perform backlash control on the front wheel torque command and corrects the rear wheel torque command in consideration of front wheel backlash delay at the same time. That is, the controller 20 is configured to determine a rear wheel torque command for compensating for the front wheel backlash delay based on the basic front wheel torque command, the basic rear wheel torque command, and a current front wheel torque.

At the present time, during a process in which the front wheel torque increases to follow the front wheel torque command, when a value obtained by subtracting the current front wheel torque from the total torque command (sum torque command, that is, "basic rear wheel torque command+basic front wheel torque command"), which is the pre-distribution torque command, is smaller than a maximum rear wheel torque set as a positive (+) torque value, a final rear wheel torque command (corrected rear wheel torque command) is determined as a value obtained by subtracting the current front wheel torque from the total torque command (the torque command obtained by adding the basic front wheel torque command and the basic rear wheel torque command).

On the other hand, during the process in which the front wheel torque increases to follow the front wheel torque command, when the basic rear wheel torque command is less than the maximum rear wheel torque set as a positive torque value, and a value obtained by subtracting the current front wheel torque from the total torque command (sum torque command, that is, "basic rear wheel torque command+basic front wheel torque command"), which is the pre-distribution torque command, is greater than the set maximum rear wheel torque, the maximum rear wheel torque is determined as the final rear wheel torque command (corrected rear wheel torque command).

Here, the front wheel torque may be front wheel torque detected by a separate sensor or a final front wheel torque command for which compensation has been completed to mitigate backlash impact in consideration of current backlash.

The final front wheel torque command for which compensation has been completed to mitigate the backlash impact may refer to a distributed front wheel torque command in a known normal mode, that is, the front wheel torque command of FIG. 4.

As described above, when the front wheel torque command and the rear wheel torque command are finally determined, the controller 20 is configured to control the corresponding motors 31 and 41 in real time according to the finally determined torque commands, respectively.

Meanwhile, when delay that occurs when the front wheel torque command enters the backlash band is compensated using the rear wheel motor torque, profiling may be performed in various forms for the torque command and sum torque command for each wheel.

Figure 6:
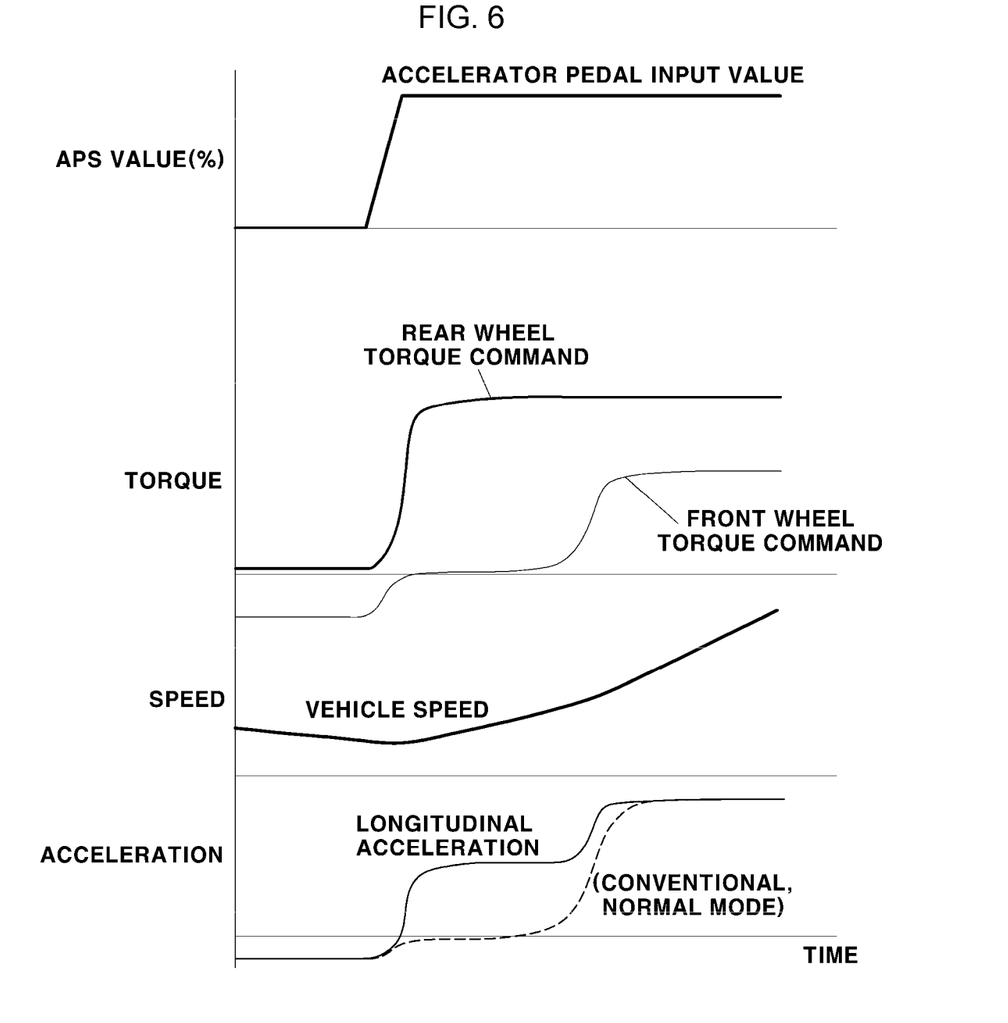
FIG. 6, FIG. 7, and FIG. 8 are diagrams illustrating various embodiments of performing torque profiling to compensate for delay that occurs when the front wheel torque command invades the backlash band in an exemplary embodiment of the present disclosure.
Figure 7:
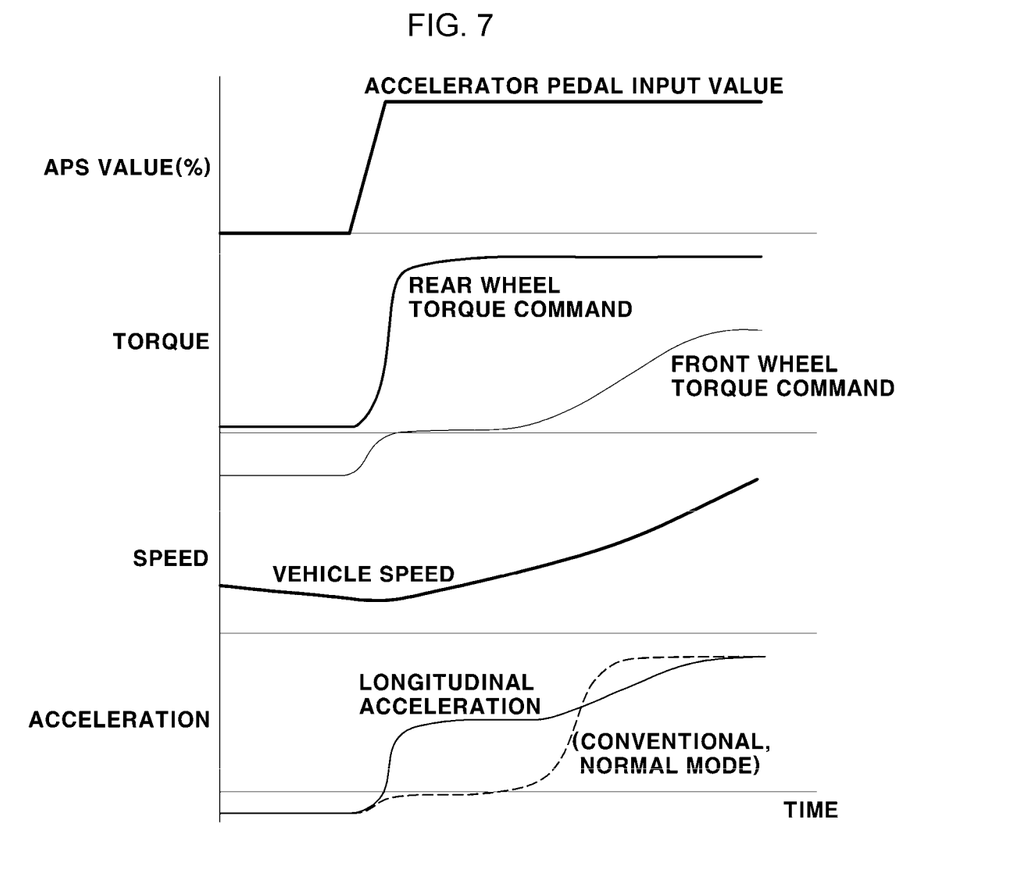
Figure 8:
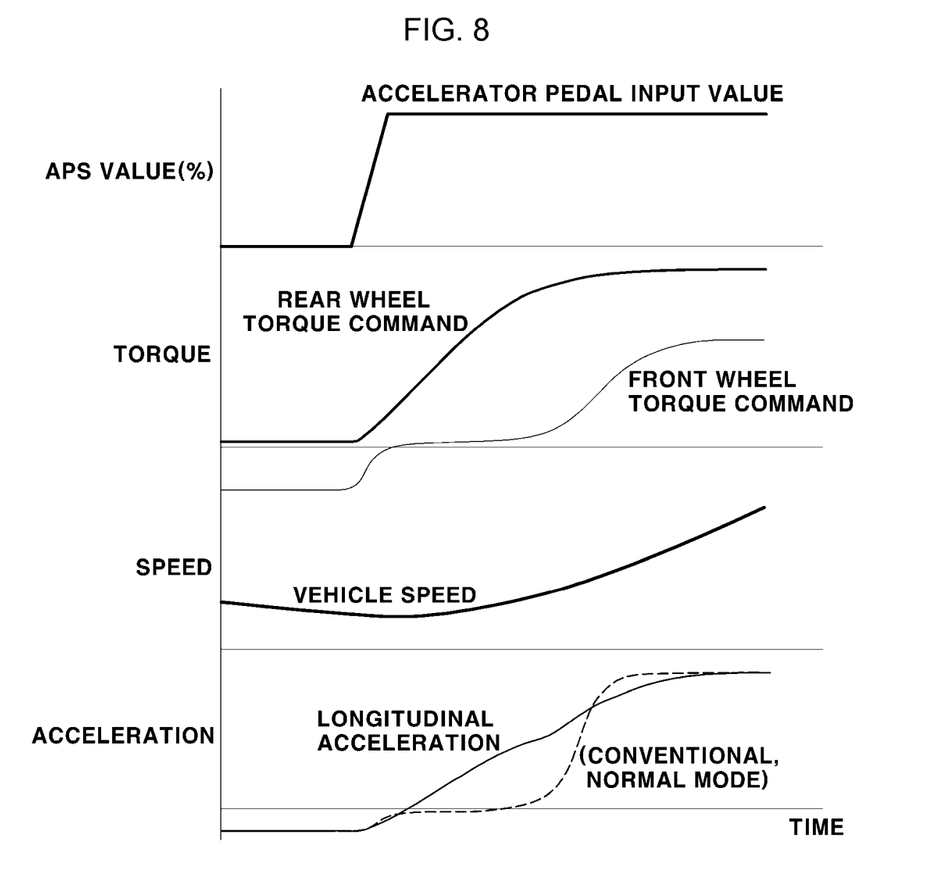

FIG. 6, FIG. 7, and FIG. 8 are diagrams illustrating various embodiments of performing torque profiling to compensate for delay that occurs when the front wheel torque command invades the backlash band in an exemplary embodiment of the present disclosure.

The exemplary embodiment of FIG. 6 may be referred to as a first torque profiling mode in which the controller 20 sequentially changes the rear wheel torque command and the front wheel torque command at a predetermined maximum permissible change rate with a time difference.

To the present end, in the exemplary embodiment of FIG. 6, the maximum permissible change rate of the rear wheel torque command considering the capacity of the rear wheel motor 41 and the maximum permissible change rate of the front wheel torque command considering capacity of the front wheel motor 31 are set in the controller 20 in advance.

That is, a permissible maximum slope (change rate) during the change of the rear wheel torque command is set in the controller 20 so that the rear wheel torque command may change (increase or decrease) as rapidly as possible. Similarly, a permissible maximum slope (change rate) during the change of the front wheel torque command is set in the controller 20 so that the front wheel torque command may change as rapidly as possible.

Here, the permissible maximum slope is the maximum permissible change rate of the rear wheel torque command and the maximum permissible change rate of the front wheel torque command. Furthermore, the maximum permissible change rate of the front wheel torque command and the maximum permissible change rate of the rear wheel torque command may be the same value or different values.

At the present time, in the case of the rear wheel torque command, immediately after the pedal input is detected, the controller 20 may be configured to determine the rear wheel torque command as a value that changes according to the maximum permissible change rate. Furthermore, in the case of the front wheel torque command, immediately after passing through the backlash band, the controller 20 may be configured to determine the front wheel torque command as a value that changes according to the maximum permissible change rate.

Referring to FIG. 6, it may be seen that the rear wheel torque command is determined as a value that increases from the minimum torque threshold value at the maximum permissible change rate immediately after the driver depresses the accelerator pedal. Furthermore, it may be seen that the front wheel torque command passing through the backlash band is determined as a value that increases at the maximum permissible change rate immediately after escaping the backlash band.

The maximum permissible change rate of the front wheel torque command in the backlash band is set in the controller 20 to a small value that does not cause backlash impact, and thus, while the front wheel torque command changes, the front wheel torque command in the backlash band is determined in the controller 20 to a value that gradually changes along the maximum permissible change rate of the small value.

Referring to FIG. 6, it may be seen that, while the front wheel torque command increases after the driver depresses the accelerator pedal, the front wheel torque command in the backlash band gradually increases at the maximum permissible change rate in the backlash band.

Furthermore, in relation to longitudinal acceleration of the vehicle, in the first torque profiling mode, as may be seen from FIG. 6, the rear wheel torque command and the front wheel torque command are sequentially increased at the maximum permissible change rate, and thus a dual sense of oscillation may occur.

The exemplary embodiment of FIG. 7 is an exemplary embodiment in which the dual sense of oscillation of the vehicle may be mitigated, and may be referred to as a second torque profiling mode in which the controller 20 changes the rear wheel torque command at a preset maximum permissible change rate and gradually changes the front wheel torque command at a change rate smaller than the maximum permissible change rate of the rear wheel torque command at the same time.

In the second torque profiling mode, as in the first torque profiling mode, the maximum permissible change rate of the rear wheel torque command is preset in the controller 20. Because there is no difference in the maximum permissible change rate of the rear wheel torque command in the second torque profiling mode compared to that in the first torque profiling mode, a detailed description thereof will be omitted.

However, in the second torque profiling mode, the maximum permissible change rate of the front wheel torque command is set to a value smaller than the maximum permissible change rate of the rear wheel torque command in the entire torque region including the backlash band, and thus the front wheel torque command is determined as a value that gradually increases.

Furthermore, in the second torque profiling mode, the maximum permissible change rate in the backlash band of the front wheel torque command is set in the controller 20 to a small value that does not cause backlash impact, as in the first torque profiling mode.

Accordingly, while the front wheel torque command changes, the front wheel torque command in the backlash band is determined in the controller 20 as a value that gradually changes according to the maximum permissible change rate of the small value.

The exemplary embodiment of FIG. 7 may provide an effect of reducing the dual sense of oscillation compared to the exemplary embodiment of FIG. 6.

The exemplary embodiment of FIG. 8 may be referred to as a mode in which the maximum permissible change rate of the rear wheel torque command is set in the controller 20 to a value smaller than the maximum permissible change rate of the rear wheel torque command in each of the first torque profiling mode and the second torque profiling mode, and the exemplary embodiment of FIG. 8 is defined as a third torque profiling mode.

In the third torque profiling mode, the maximum permissible change rate of the front wheel torque command is set in the controller 20 to a small value that does not cause backlash impact in the backlash band. Accordingly, while the front wheel torque command changes, the front wheel torque command in the backlash band is determined in the controller 20 as a value that gradually changes according to the maximum permissible change rate of the small value.

Furthermore, considering torque change delay caused by the gradually changing front wheel torque command, a slope of the rear wheel torque command that prevents discontinuity from occurring in a slope of the sum torque command (torque obtained by summing the front wheel torque command and the rear wheel torque command) is set in the controller 20 as the maximum permissible change rate of the rear wheel torque command.

That is, the maximum permissible change rate of the rear wheel torque command is a slope of the rear wheel torque that prevents discontinuity from occurring in a slope of a curve representing a change of the sum torque command over time.

At the present time, the maximum permissible change rate of the rear wheel torque command may be set to a value smaller than the maximum permissible change rate of the rear wheel torque command in each of the first torque profiling mode and the second torque profiling mode, and thus the rear wheel torque command may be determined as a value that changes more gradually when compared to other modes.

Here, preventing discontinuity from occurring in the slope of the curve and preventing discontinuity from occurring in the slope of the sum torque command mean that the curve becomes a straight line and that the slope includes a constant value.

Referring to FIG. 8, it may be seen that, even though the rear wheel torque command increases at the maximum permissible change rate immediately after the driver depresses the accelerator pedal, because the maximum permissible change rate including a smaller value than that of each of the first torque profiling mode and the second torque profiling mode is used at the present time, the rear wheel torque command of the third torque profiling mode increases more gradually when compared to the first torque profiling mode (see FIG. 6) and the second torque profiling mode (see FIG. 7).

Furthermore, in relation to the longitudinal acceleration of the vehicle, referring to FIG. 8, it may be seen that, because a slope allowing the slope of the sum torque command to become a constant value is used as the maximum permissible change rate of the rear wheel torque command in the third torque profiling mode, the longitudinal acceleration increases at an approximately constant slope without discontinuity in the slope.

In the present way, the drive system torque control method according to the exemplary embodiment of the present disclosure has been described in detail. According to an exemplary embodiment of the present disclosure described above, the backlash band evasion control of the drive system is executed, and motor control specialized for the high-performance driving mode is performed, so that occurrence of backlash itself may be prevented, because the motor is used only in a torque range irrelevant to backlash, backlash vibration and noise impact problems may be effectively solved.

Furthermore, because driving force may be generated without concern about backlash problems, longitudinal responsiveness of the vehicle may be greatly improved. A driving mode emphasizing direct connection for high-performance electric vehicles may be provided, convenience and accuracy of load movement control when turning on a track may be improved, and ease of use of a special driving mode such as a drift mode may be improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling torque of a drive system of an electric vehicle, the method comprising:
    determining, by a controller, a required torque according to a vehicle driving state while the vehicle is driven, and determining a total torque command based on the determined required torque; and
    performing, by the controller, a front wheel and rear wheel torque distribution process on the total torque command, so that a front wheel torque command and a rear wheel torque command following the total torque command are determined,
    wherein the rear wheel torque command is determined as a value equal to or greater than a minimum torque threshold value set as a positive (+) torque value, and
    wherein the minimum torque threshold value is set to a value greater than an upper limit threshold value of a backlash band, which is a torque region where there is possibility that backlash occurs in a rear wheel-side drive system.

2. The method of claim 1, wherein the backlash band of the rear wheel-side drive system is set to a torque range including 0 torque while bordering a lower limit threshold value, which is a negative (−) value, and an upper limit threshold value, which is a positive (+) value.

3. The method of claim 1, wherein, in response that an ON state of a backlash band evasion mode is selected and received from a driver, the controller is configured to maintain the rear wheel torque command at a value equal to or greater than the minimum torque threshold value.

4. The method of claim 1, wherein the front wheel torque command is determined as a positive (+) torque value or a negative (−) torque value obtained by subtracting the rear wheel torque command from the total torque command.

5. The method of claim 1,
    wherein a driving input value is an accelerator pedal input value, and
    wherein in response that the accelerator pedal input value from a driver is not detected, the controller is configured to determine the rear wheel torque command as the minimum torque threshold value.

6. The method of claim 1,
    wherein a driving input value is an accelerator pedal input value from a driver, and
    wherein in response that a driver tips-in an accelerator pedal and the accelerator pedal input value is detected, the controller is configured:
        to switch the front wheel torque command from a negative (−) torque value before tip-in of the accelerator pedal to a positive (+) torque value after tip-in of the accelerator pedal; and
        to perform backlash control for limiting a torque slope of the front wheel torque command while the front wheel torque command passes through a backlash band, which is a torque region where there is possibility that backlash occurs in a front wheel-side drive system.

7. The method of claim 6, wherein the backlash band of the front wheel-side drive system is set to a torque range including 0 torque while bordering a lower limit threshold value, which is a negative (−) value, and an upper limit threshold value, which is a positive (+) value.

8. The method of claim 6,
    wherein a maximum permissible change rate in the backlash band of the front wheel torque command is set in the controller; and
    wherein the controller is configured to limit the torque slope of the front wheel torque command to the maximum permissible change rate while performing the backlash control.

9. The method of claim 8, wherein, in the controller, the maximum permissible change rate in the backlash band of the front wheel torque command is set to a value not causing backlash impact in the front wheel-side drive system.

10. The method of claim 6, wherein, while performing the backlash control for limiting the torque slope of the front wheel torque command, the controller is configured to perform a process of correcting a distributed rear wheel torque command based on the front wheel torque command and the rear wheel torque command distributed from the front wheel and rear wheel torque distribution process for the total torque command, and a current front wheel torque.

11. The method of claim 10, wherein, when a value obtained by subtracting the current front wheel torque from the total torque command is smaller than a maximum rear wheel torque set as a positive (+) torque value in a process of correcting the rear wheel torque command, the controller is configured to determine the value obtained by subtracting the current front wheel torque from the total torque command as the corrected rear wheel torque command.

12. The method of claim 10, wherein, when the rear wheel torque command distributed from the total torque command is smaller than a maximum rear wheel torque set as a positive (+) torque value, and a value obtained by subtracting the current front wheel torque from the total torque command is greater than the set maximum rear wheel torque in a process of correcting the rear wheel torque command, the controller is configured to determine the maximum rear wheel torque as the corrected rear wheel torque command.

13. The method of claim 10, wherein the current front wheel torque is the front wheel torque command, a torque slope of which is limited during the backlash control, or a front wheel torque detected by a sensor.

14. The method of claim 6, wherein the controller is configured to:
increase the rear wheel torque command after tip-in of the accelerator pedal according to a preset maximum permissible change rate;
increase the front wheel torque command according to the preset maximum permissible change rate after passing through the backlash band; and
cause a sum of the rear wheel torque command and the front wheel torque command to follow the total torque command determined based on the required torque.

15. The method of claim 14, wherein a maximum permissible change rate of the front wheel torque command is set in the controller to a value smaller than a maximum permissible change rate of the rear wheel torque command.

16. The method of claim 14, wherein the maximum permissible change rate of the rear wheel torque command is set to a slope of the rear wheel torque command that prevents discontinuity from occurring in a slope of the total torque command, which is a sum of the front wheel torque command and the rear wheel torque command subjected to the backlash control.

17. The method of claim 1, wherein the determining of the front wheel torque command and the rear wheel torque command includes comparing, by the controller, the total torque command with a minimum rear wheel torque threshold value, and determining the rear torque command as the minimum rear wheel torque threshold value when the total torque command is less than or equal to the minimum rear wheel torque threshold value, wherein the front wheel torque command is determined as a value obtained by subtracting the determined rear wheel torque command from the total torque command.

18. A non-transitory computer readable storage medium on which a program for performing the method of claim 1 is recorded.

19. An apparatus for controlling torque of a drive system of a vehicle, the apparatus comprising:
a sensor configured for obtaining vehicle driving state of the vehicle while the vehicle is driven;
a processor connected to the sensor and configured to:
determining a required torque according to the vehicle driving state while the vehicle is driven, and determining a total torque command based on the determined required torque; and
performing a front wheel and rear wheel torque distribution process on the total torque command, so that a front wheel torque command and a rear wheel torque command following the total torque command are determined,
wherein the rear wheel torque command is determined as a value equal to or greater than a minimum torque threshold value set as a positive (+) torque value, and
wherein the minimum torque threshold value is set to a value greater than an upper limit threshold value of a backlash band, which is a torque region where there is possibility that backlash occurs in a rear wheel-side drive system; and
a non-transitory storage medium configured for storing an algorithm for an operation of the processor.

20. The apparatus of claim 19, wherein,
in response that an ON state of a backlash band evasion mode is selected and received from a driver, the controller is configured to maintain the rear wheel torque command at a value equal to or greater than the minimum torque threshold value, or
in response that the accelerator pedal input value from a driver is not detected, the controller is configured to determine the rear wheel torque command as the minimum torque threshold value, or
in response that the driver tips-in an accelerator pedal and the accelerator pedal input value is detected, the controller is configured:
to switch the front wheel torque command from a negative (−) torque value before tip-in of the accelerator pedal to a positive (+) torque value after tip-in of the accelerator pedal; and
to perform backlash control for limiting a torque slope of the front wheel torque command while the front wheel torque command passes through a backlash band, which is a torque region where there is possibility that backlash occurs in a front wheel-side drive system.

* * * * *